United States Patent
Chu

(10) Patent No.: US 9,242,743 B2
(45) Date of Patent: Jan. 26, 2016

(54) SIDE-BY-SIDE MULTIPLE LAUNCH CONFIGURATION

(71) Applicant: Space Systems/Loral, LLC, Palo Alto, CA (US)

(72) Inventor: Peter Y. Chu, Palo Alto, CA (US)

(73) Assignee: Space Systems/Loral, LLC, Palo Alto, CA (US)

(*) Notice: Subject to any disclaimer, the term of this patent is extended or adjusted under 35 U.S.C. 154(b) by 0 days.

(21) Appl. No.: 14/108,213

(22) Filed: Dec. 16, 2013

(65) Prior Publication Data
US 2015/0102174 A1    Apr. 16, 2015

Related U.S. Application Data

(60) Provisional application No. 61/889,321, filed on Oct. 10, 2013.

(51) Int. Cl.
*B64G 1/00* (2006.01)
*B64G 1/64* (2006.01)
*B64G 1/50* (2006.01)

(52) U.S. Cl.
CPC *B64G 1/002* (2013.01); *B64G 1/64* (2013.01); *B64G 1/641* (2013.01); *B64G 1/007* (2013.01); *B64G 1/50* (2013.01); *B64G 2001/643* (2013.01)

(58) Field of Classification Search
CPC .......... B64G 1/002; B64G 1/14; B64G 1/222; B64G 1/64; B64G 1/641; B64G 1/645
See application file for complete search history.

(56) References Cited

U.S. PATENT DOCUMENTS

| | | | |
|---|---|---|---|
| 5,199,672 A | 4/1993 | King et al. | |
| 5,411,226 A * | 5/1995 | Jones et al. | 244/173.3 |
| 5,613,653 A * | 3/1997 | Bombled et al. | 244/173.1 |
| 5,720,450 A * | 2/1998 | Kanne | 244/173.1 |
| 6,276,639 B1 | 8/2001 | Hornung et al. | |
| 6,296,206 B1 | 10/2001 | Chamness et al. | |
| 6,557,802 B2 * | 5/2003 | Kroeker | 244/173.3 |
| 7,118,077 B1 | 10/2006 | Kistler et al. | |
| 7,832,687 B1 | 11/2010 | Das et al. | |

(Continued)

FOREIGN PATENT DOCUMENTS

EP    1104743    6/2001
FR    2805245    8/2001

OTHER PUBLICATIONS

Ariane Structure for Auxilliary Payload 5 User's Manual Space & Electronics Group, "Rapid Spacecraft Development Office, T100 Spacecraft", NASA, TRW, 00S00993-1001 NT, 72 pages.

(Continued)

*Primary Examiner* — Tien Dinh
*Assistant Examiner* — Christopher Hutchens
(74) *Attorney, Agent, or Firm* — Weaver Austin Villeneuve & Sampson LLP

(57) ABSTRACT

A launch vehicle payload that includes at least two spacecraft is disclosed. The launch vehicle includes a single payload adapter. Each spacecraft has a launch vehicle adapter structure providing a respectively coplanar structural interface directly with the single launch vehicle payload adapter. The spacecraft share a launch vehicle payload fairing volume substantially side-by-side and are detachably coupled together such that a positive clearance is provided between adjacent, non-abutting structural body surfaces of each spacecraft.

20 Claims, 5 Drawing Sheets

(56) References Cited

U.S. PATENT DOCUMENTS

| | | |
|---|---|---|
| 8,366,053 B2 | 2/2013 | Watts |
| 2006/0038085 A1 | 2/2006 | Duden |
| 2012/0261515 A1 | 10/2012 | Smith et al. |
| 2014/0131521 A1* | 5/2014 | Apland et al. .............. 244/173.3 |
| 2014/0239125 A1* | 8/2014 | Aston et al. ................ 244/172.3 |
| 2015/0028159 A1* | 1/2015 | Vichnin et al. ............. 244/172.8 |

OTHER PUBLICATIONS

International Search Report dated Feb. 20, 2015 in PCT/US2014/058302.

* cited by examiner

SIDE-BY-SIDE MULTIPLE LAUNCH CONFIGURATION

CROSS-REFERENCE TO RELATED APPLICATIONS

This disclosure claims priority under 35 U.S.C. §119 to U.S. Provisional Patent Application No. 61/889,321, filed Oct. 10, 2013, entitled "SIDE-BY-SIDE MULTIPLE LAUNCH CONFIGURATION," and assigned to the assignee hereof, the disclosure of which is incorporated by reference, in its entirety, into the present disclosure for all purposes.

TECHNICAL FIELD

This invention relates generally to a payload, including two or more spacecraft configured to be launched within a common launch vehicle fairing, and more particularly to a payload in which the spacecraft are detachably coupled together and share a volume of the launch vehicle fairing volume side-by-side.

BACKGROUND OF THE INVENTION

The assignee of the present invention designs and manufactures spacecraft for communications and broadcast services. The spacecraft are carried into space, into a transfer or operational orbit, for example, by a launch vehicle. Structures of such spacecraft commonly include a structural interface ring (the "payload launch vehicle adapter structure") or other load bearing structure which mates to an adapter ring or other load bearing structure or dispenser associated with the launch vehicle.

An example of a known technique for interfacing a payload to a launch vehicle is illustrated in FIG. 1A. In the illustrated example, a single spacecraft 110 is configured for launch on a launch vehicle 120. Launch vehicle 120 includes a payload fairing 121 and launch vehicle payload interface ring 125. Spacecraft 110 has a payload launch vehicle adapter structure 115 that detachably mates to the launch vehicle payload interface ring 125.

It is often desirable to configure two or more spacecraft for simultaneous launch on the same launch vehicle. Conventional stacked dual-launch configurations are illustrated in FIG. 1B and FIG. 1C. Because many conventional spacecraft have a cube-like form factor, a natural conventional dual launch configuration contemplates stacking one spacecraft on top of the other. This approach may provide an advantage of splitting the launch vehicle cost while more fully utilizing available payload fairing volume. In the configuration illustrated in FIG. 1B, the lower spacecraft 110(1) supports the upper spacecraft 110(2) during launch. In the configuration illustrated in FIG. 1C, a dual payload carrier 126 may be provided, as disclosed, for example, in U.S. Pat. No. 7,832, 687, thereby alleviating the need for the lower spacecraft 110(1) to provide load bearing support for the upper spacecraft 110(2) but necessitating the cost, mass and complexity of the dual payload carrier.

A characteristic feature of the above described techniques is that launch acceleration loads are substantially orthogonal to an interface plane at which the payload launch vehicle interface ring and the launch vehicle payload interface ring are joined. Moreover, it will be appreciated that a central axis of the interface rings is coaxial with the launch vehicle longitudinal axis.

In alternative known arrangements, multiple spacecraft may be launched on a common launch vehicle in the configurations illustrated in FIGS. 1D and 1E, for example. Referring first to FIG. 1D, an arrangement is illustrated wherein eight auxiliary payloads 111 may be launched together with a primary payload, spacecraft 110(1). It will be appreciated that in such a configuration, as illustrated, the auxiliary payloads 111(1) through 111(8) must be a small fraction of the mass and envelope of spacecraft 110(1). Referring now to FIG. 1E, an example of another known arrangement is illustrated wherein multiple spacecraft are supported by a common adapter structure 126, which may be referred to as a "dispenser". It will be appreciated that, in the illustrated configuration, launch acceleration loads are substantially parallel to an interface plane at which each spacecraft interfaces to the common adapter structure. As a result, spacecraft 112(1)-112(4) are cantilevered with respect to the launch acceleration loads.

It is desirable to find improved arrangements whereby two or more spacecraft may be accommodated within a single payload fairing while the disadvantages noted above are reduced.

SUMMARY

The present disclosure contemplates an improved configuration of a launch vehicle payload, wherein multiple spacecraft share a launch vehicle payload fairing volume substantially side-by-side. The disclosed techniques provide excellent structural mass efficiency and facilitate provision of a spacecraft configuration having a rectangular cross section, wherein a first pair of opposite sides is substantially greater in width than a second pair of opposite sides.

In some implementations, a payload for a launch vehicle includes at least two spacecraft. The launch vehicle includes a single payload adapter, and each spacecraft has a launch vehicle adapter structure providing a respectively coplanar structural interface directly with the single payload adapter. The spacecraft share a launch vehicle payload fairing volume substantially side-by-side and are detachably coupled together such that a positive clearance is provided between adjacent, non-abutting structural surfaces of each spacecraft.

In an implementation, the coplanar structural interface may be substantially orthogonal to a longitudinal axis of the launch vehicle.

In another implementation, at least one of the spacecraft may be a dummy structure for the purpose of simulating a real spacecraft to structurally support the other spacecraft and completes the launch vehicle interface for launch.

In another implementation, the at least two spacecraft may be detachably secured relative to each other by at least one holddown device, the at least one holddown device being configured to be released after launch. The at least one holddown device may be detached only after performing an orbit raising maneuver with an onboard propulsion system of at least one of the two spacecraft. The at least one holddown device may be detached only after performing an orbit raising maneuver with an onboard propulsion system of only one of the two spacecraft.

In a yet further implementation at least one of the two spacecraft may be configured to be deployed in an on-orbit configuration having an orbital plane, the spacecraft having a yaw axis within the orbital plane and directed from a spacecraft coordinate system origin toward nadir, a pitch axis orthogonal to the orbit plane and passing through the spacecraft coordinate system origin, and a roll axis orthogonal to the pitch axis and the yaw axis and passing through the spacecraft coordinate system origin. The spacecraft may include a first panel and a third panel substantially disposed, in the on-orbit configuration, respectively, orthogonal to the pitch axis and facing toward opposite directions, each panel having a first width in a first direction parallel to the roll axis; and a second and a fourth panel substantially disposed, in the on-orbit configuration, respectively, orthogonal to the roll axis and having a second width in a second direction parallel to the pitch axis. An aspect ratio of the first width to the second width may be substantially greater than one. In an implementation, the aspect ratio may be at least two. The adjacent, non-abutting body surfaces of each spacecraft may be generally orthogonal to the pitch axis.

In an implementation, at least a portion of each spacecraft may have a substantially 'U' shaped configuration, including a central recess, and two outboard segments. At least one outboard segment of a first spacecraft may be disposed within the central recess of a second spacecraft.

In some implementations, an apparatus for deployment by a launch vehicle includes a first spacecraft. The launch vehicle includes a single payload adapter. Each spacecraft has a launch vehicle adapter structure providing a respectively coplanar structural interface directly with the single payload adapter. The first spacecraft is configured to share, substantially side-by-side with the second spacecraft, a launch vehicle payload fairing volume, and is detachably coupled with the second spacecraft such that a positive clearance is provided between a first structural surface of the first spacecraft and an adjacent, non-abutting structural surface of the second spacecraft.

BRIEF DESCRIPTION OF THE DRAWINGS

Features of the invention are more fully disclosed in the following detailed description of the preferred embodiments, reference being had to the accompanying drawings, in which.

Figure 1C:
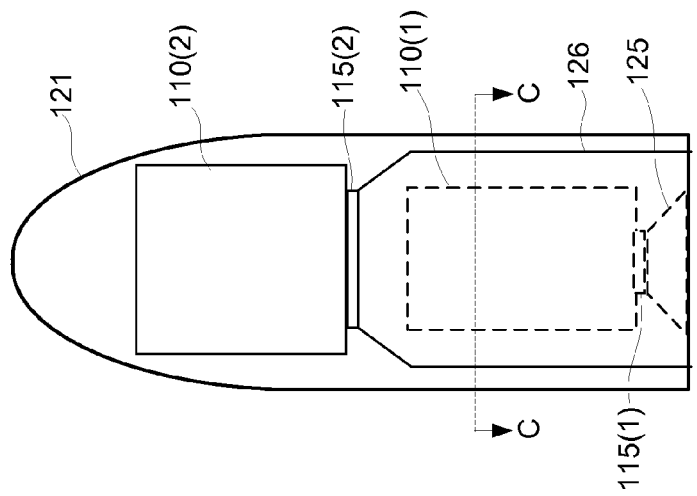
FIGS. 1B through 1E illustrate techniques for interfacing two or more payloads to a common launch vehicle according to the prior art.
Figure 1C:
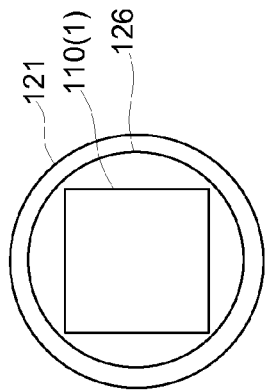

Throughout the drawings, the same reference numerals and characters, unless otherwise stated, are used to denote like features, elements, components, or portions of the illustrated embodiments. Moreover, while the subject invention will now be described in detail with reference to the drawings, the description is done in connection with the illustrative embodiments. It is intended that changes and modifications can be made to the described embodiments without departing from the true scope and spirit of the subject invention as defined by the appended claims.

DETAILED DESCRIPTION

Specific exemplary embodiments of the invention will now be described with reference to the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when an element is referred to as being "connected" or "coupled" to another element, it can be directly connected or coupled to the other element, or intervening elements may be present. It will be understood that although the terms "first" and "second" are used herein to describe various elements, these elements should not be limited by these terms. These terms are used only to distinguish one element from another element. As used herein, the term "and/or" includes any and all combinations of one or more of the associated listed items. The symbol "/" is also used as a shorthand notation for "and/or".

The present inventor has appreciated that two or more spacecraft may be disposed, in a launch configuration, within a payload fairing of the launch vehicle such that a single launch vehicle adapter is simultaneously shared by the at least two spacecraft. In some implementations, the spacecraft may be detachably coupled together by, for example, releasable holddown devices or the like. Advantageously, the releasable devices may be disposed so as to provide a positive clearance between respective adjacent and non-abutting surfaces of the respective spacecraft structural bodies. The positive clearance may provide a volume within which deployable appendages of the spacecraft such as solar arrays an antenna reflectors may be disposed during launch.

Figure 1B:
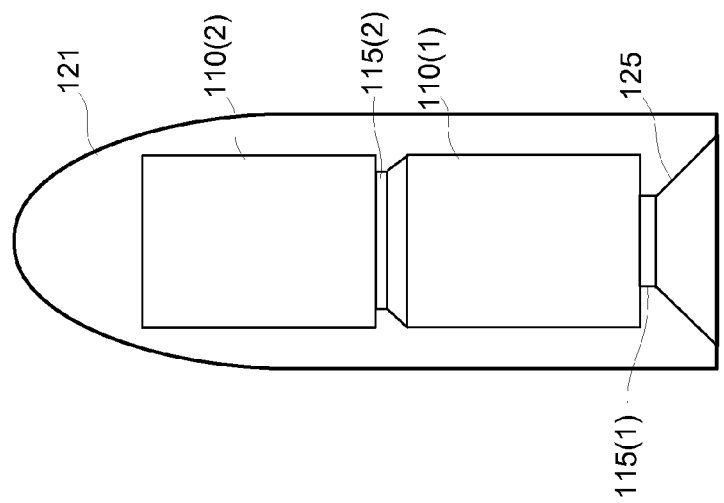
Figure 1A:
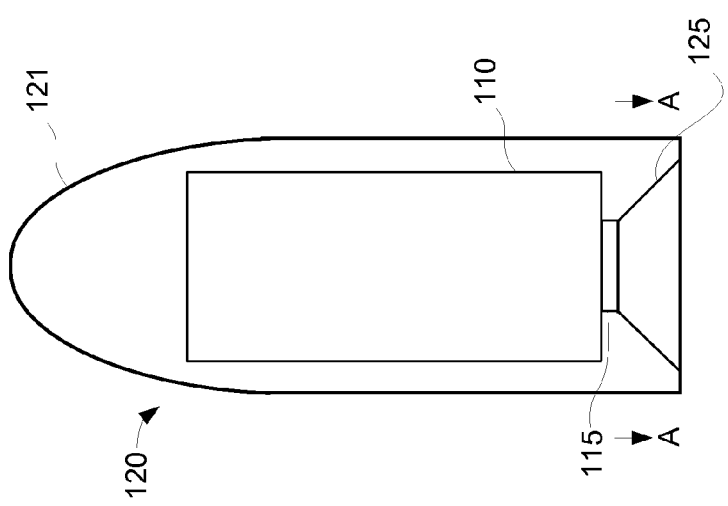
FIG. 1A illustrates a technique for interfacing a payload to a launch vehicle according to the prior art.
Figure 1A:
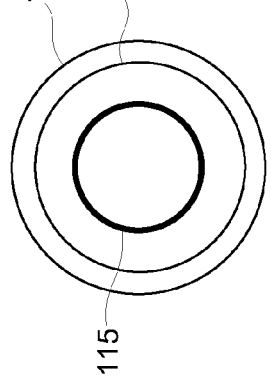

A Particular implementations of the subject matter described in this disclosure may realize one or more of the following advantages. In accordance with the presently disclosed techniques, significant structural mass efficiencies may be obtained because each spacecraft may have a direct structural interface with the launch vehicle adapter ring. In contrast to the prior art approach illustrated in FIG. 1B, for example, the presently disclosed techniques provide that neither spacecraft structure is required to support the launch loads of the other spacecraft. In contrast to the prior art approach illustrated in FIG. 1C, for example, the presently disclosed techniques permit avoiding the mass, cost penalties associated with the dual payload carrier 126. The releasable devices may provide for a relatively rigid multi-spacecraft assembly during launch while resisting dynamic launch loads (compressive, tension, and twisting among others) transverse to the launch vehicle longitudinal axis.

The presently disclosed techniques may advantageously be employed for launch vehicle payloads including two spacecraft having approximately similar mass and envelope dimensions. Excellent structural mass efficiency may be achieved because, for example, launch acceleration loads are orthogonal to the interface plane at which the payload launch vehicle interface ring and the launch vehicle payload interface ring are joined. Moreover, the spacecraft may each have an interface with a single, common, launch vehicle payload interface structure. Advantageously, the common launch vehicle payload interface ring may be a minor modification of a standard, heritage-design structural component of the launch vehicle.

Figure 2:
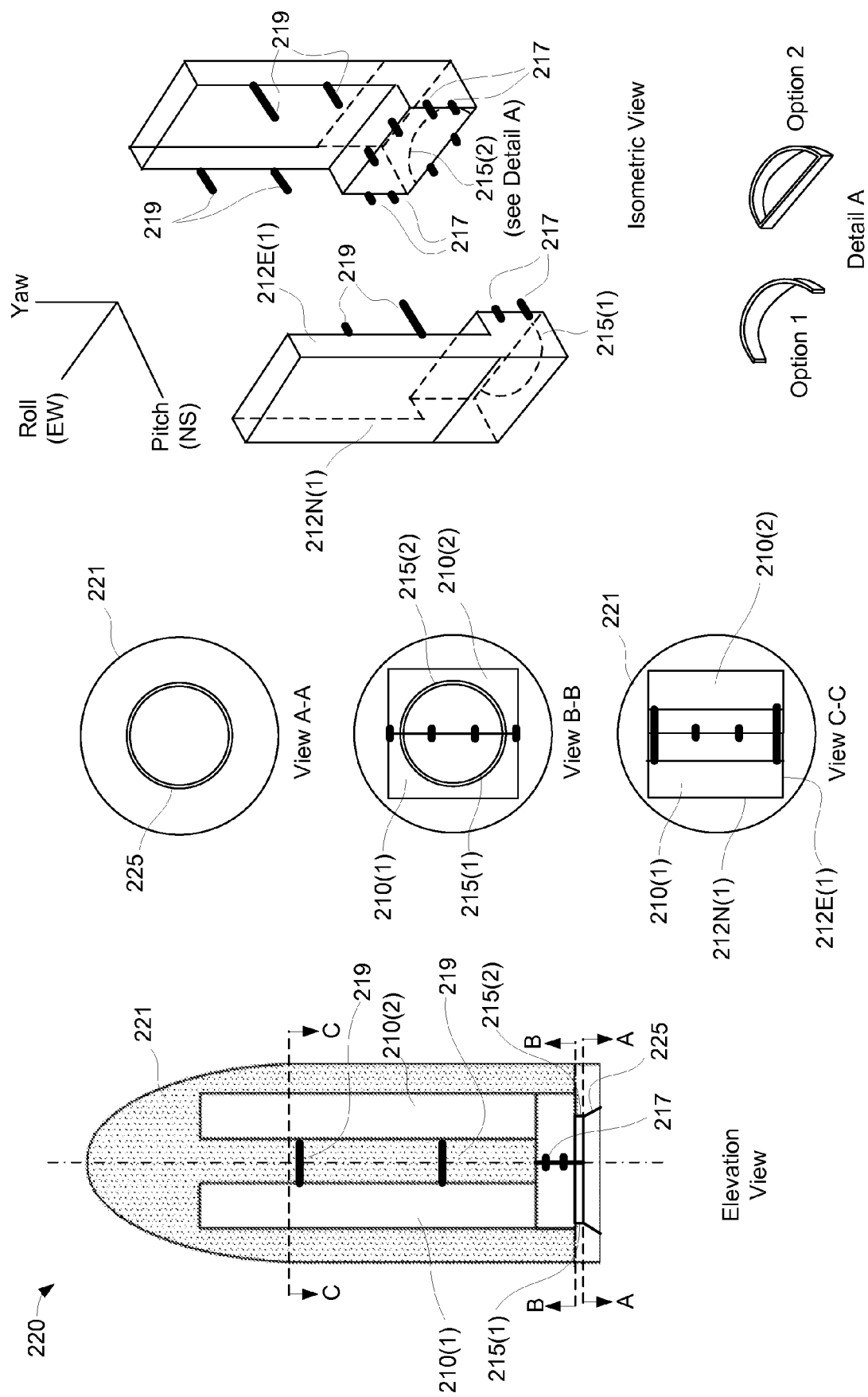
FIG. 2 illustrates techniques for interfacing a payload to a launch vehicle according to an implementation.

Referring now to FIG. 2, in an implementation, a payload to be carried by launch vehicle 220 may include two spacecraft, 210(1) and 210(2) contained within an interior volume of payload fairing 221. The launch vehicle may include a payload adapter 225.

Advantageously, the spacecraft, 210(1) and the spacecraft 210(2) may be configured to share the interior volume of the payload fairing 221 volume substantially side-by-side. Each spacecraft may be structurally coupled together by, for example detachable mechanical holddown devices 217 and 219 or the like. Each spacecraft 210 may include a separate structural interface directly with the single payload adapter 225. For example, in the illustrated implementation, spacecraft 210(1) includes a substantially semicircular adapter structure 215(1); similarly, spacecraft 210(2) includes a substantially semicircular adapter structure 215(2). Adapter structures 215(1) and 215(2) may have the same radius, which, advantageously may correspond to a radius of a payload adapter 225. In some implementations, one or both of adapter structures 215(1) and 215(2) may be configured as an open 'C' shaped structure (Detail A, Option 1). In some implementations, one or both of adapter structures 215(1) and 215(2) may be configured as a closed, 'D' shaped structure (Detail A, Option 2). In either configuration, adapter structures 215(1) and 215(2) may or may not be configured to be an exact 50-50 split of a circle defined by payload adapter 225.

It will be appreciated that the illustrated configuration, spacecraft 210(1) and 210(2) are depicted as structural bodies having simple rectilinear geometry, but this is not necessarily so. Moreover, solar arrays and other deployable appendages have been omitted for clarity. Such deployable appendages may, for example, be stowed anywhere in the shaded area of payload fairing volume 221, including in the shaded space between the illustrated structural body of spacecraft 210(1) and the illustrated structural body of spacecraft 210(2). In some implementations, holddown devices 219 may be disposed outside the perimeter of such deployable appendages or be configured to pass through and/or go around such deployable appendages. In some implementations, holddown devices 217 may be configured to clamp together adjacent structural body surfaces of each spacecraft. Advantageously, holddown devices 219 may be configured such that there is a positive clearance provided between adjacent, body surfaces of the spacecraft, such that at least a portion of those respective body surfaces are non-abutting.

It will be appreciated that FIG. 2 illustrates a particular arrangement of holddown devices 217 and 219 for purposes of example only. The presently disclosed techniques contemplate that the quantity and configuration of the holddown devices 217 and 219 may vary substantially from the illustrated arrangement. For example, the arrangement of holddown devices 217 and 219 on each spacecraft 210(1) and spacecraft 210(2) may not be mutually symmetrical, identical, or a mirror image with respect to the two spacecraft. Moreover, the holddown devices 217 and 219 may be configured in a variety of shapes, lengths, and inter-relationships, and may include release mechanisms suitable for the particular needs of each spacecraft and its appendages with respect to the neighboring spacecraft and the available launch vehicle fairing space. It should also be noted that holddown devices 217 and 219 do not have to split the two spacecraft on any single plane therebetween.

Although in the illustrated implementation, two spacecraft are contemplated, the present teachings may be extended to a launch configuration including three spacecraft, for example. In such implementations, each spacecraft may include a launch vehicle adapter occupying approximately ⅓ of the circle defined by payload adapter 225. The holddown devices 217 and 219 may tie each of three pairs of respective interfaces between the three spacecraft. Likewise, this configuration may be extended to additional spacecraft in a side-by-side configuration.

Referring still to FIG. 2, in a launch configuration such as illustrated in the "Elevation View", adapter structures 215(1) and 215(2) jointly present an interface mating surface to the payload adapter 225. A conventional or a reinforced band clamp may secure the coupling between the payload and the launch vehicle until released after launch.

According to the presently disclosed techniques, the payload fairing volume is split side-by-side such that each spacecraft 210 supports its own mass along the launch vehicle longitudinal axis. As a result, a considerable savings in structural mass may be achieved because structural inefficiencies associated with prior art dual launch techniques are avoided. More specifically, neither spacecraft is required to structurally support the other against longitudinal launch loads. Likewise, a need for a dual payload carrier or payload dispenser is obviated.

In some implementations, one of the spacecraft 210 may be a dummy structure for the purpose of simulating a second spacecraft and to support the first spacecraft during launch. Such implementations may be useful, for example, to mitigate schedule delays in the event that one spacecraft of a planned dual spacecraft launch is unavailable.

The presently disclosed techniques also avoid undesirable constraints on the envelope of spacecraft 210. For example, the length of each spacecraft in a direction parallel to the launch vehicle longitudinal axis may be substantially larger than is possible in any of the prior art launch configurations described above. Moreover, referring still to FIG. 2, it may be observed in view C-C and in the "Isometric View" that at least a portion of each spacecraft 210(1) and 210(2) may be configured with a rectangular cross section, wherein a first pair of opposite sides is substantially greater in width than a second pair of opposite sides. Advantages of these features may be better understood in view of the following discussion.

For a spacecraft intended to be operated in a near-equatorial orbit such as a geosynchronous orbit, a first panel surface 212N may face generally north when the spacecraft is in an on-orbit configuration, and may be referred to hereinafter as the north panel. A second panel surface 212E may be referred to hereinafter as the east panel. A third panel surface and a fourth panel surface, disposed opposite, respectively, to north panel 212N and east panel 212E will be referred to hereinafter, respectively, as the south panel and the west panel. Each of the north and south panels has a first substantially equal width in the east-west direction (EW width); each of the east and west panels has a second substantially equal width in the north-south direction (NS width). The ratio of the EW width of a north/south panel to the NS width of an east/west panel will be referred to herein as the aspect ratio.

On-orbit, the north or south panels of a spacecraft in near-equatorial orbit experience a solar radiation exposure that is relatively benign and stable compared to the east/west panels which experience significant diurnal cycles as the spacecraft orbits the Earth. Because operating internal payload and bus equipment of the spacecraft dissipate heat and may be damaged by excessive temperature, such equipment is preferably mounted on a north or south panel for efficient radiative dissipation into cold space. As a result, a larger aspect ratio is preferable for purposes of maximizing equipment mounting area availability on north and south panels.

Advantageously, the presently disclosed techniques permit simultaneous launch of at least two spacecraft, each spacecraft having a substantially larger aspect ratio than would ordinarily possible. As a result, for example, where two spacecraft are accommodated within a launch vehicle fairing, at least 4 large north/south panels may be accommodated within the launch vehicle fairing.

More generally, where a spacecraft is configured to be deployed into an orbit characterized by an orbital plane, the spacecraft has a yaw axis within the orbital plane and directed from a spacecraft coordinate system origin toward nadir, a pitch axis orthogonal to the orbit plane and passing through the spacecraft coordinate system origin, and a roll axis orthogonal to the pitch axis and the yaw axis and passing through the spacecraft coordinate system origin. The spacecraft may include a first panel and a third panel substantially disposed, in the on-orbit configuration, respectively, orthogonal to the pitch axis and facing toward opposite directions, each panel having a width (EW width) in a first direction parallel to the roll axis; and a second and a fourth panel substantially disposed, in the on-orbit configuration, respectively, orthogonal to the roll axis and having a width (NS width) in a second direction parallel to the pitch axis.

Advantageously, the configuration illustrated in FIG. 2 enables each of spacecraft 210(1) and 210(2) to have a substantially larger aspect ratio than may be afforded in the absence of the present teachings. Advantageously, the aspect ratio of EW width to NS width may be substantially greater than one. In some implementations, the aspect ratio may be at least two.

In some implementations, each spacecraft may have north/south panels about the same EW width as a conventional single launch spacecraft. Advantageously, the length of the north/south panels (along the yaw axis) may be considerably larger than that available to a conventional dual launch spacecraft (see FIGS. 1B and 1C). Indeed, a comparison of the payload configuration illustrated in FIG. 2 with the conventional dual launch spacecraft depicted in FIGS. 1B and 1C makes plain that the presently disclosed techniques enable an approximate doubling of the payload north-south panel areas that can be accommodated by a given launch vehicle.

Each spacecraft can have long or large deployable antenna reflectors (not illustrated) with long focal length, unencumbered by another spacecraft at top or bottom. The available payload fairing volume surrounding the two spacecraft bodies may be judiciously shared between spacecraft to accommodate antennas in an optimal or case-by-case manner, substantially independent of the location of holddown devices 217 and 219. Equal or unequal shares of the payload fairing volume may be allocated to each spacecraft. In some implementations, each spacecraft sharing the payload fairing volume may be substantially similar in size and shape. In some implementations, the two spacecraft, for example, may be configured as respective mirror images of each other. In yet other implementations, one spacecraft can be substantially larger than the other.

Releasable holddown devices may be employed during, at least, launch operations to detachably couple adjacent spacecraft. For example, releasable holddown devices 217 and 219 may mutually secure spacecraft 210(1) and 210(2) during launch, so as to provide lateral support with respect to lateral, bending, torsional, and other launch loads, and/or more secure mating with the payload adapter 225.

In some implementations, releasable holddown devices 217 and 219 may be released upon or after separation of the spacecraft 210(1) and the spacecraft 210(2) from the launch vehicle 220 as a tied-together assembly. Subsequent to release of holddown devices 217 and 219, the two spacecraft may be configured to drift away from each other generally along a direction parallel to the pitch axis.

In some implementations, one or more orbit raising maneuvers may be executed subsequent to deployment of the spacecraft from the launch vehicle 220 and prior to releasing at least some of the releasable holddown devices 217 and 219. As a result, advantageously, an orbit raising maneuver may be executed on both spacecraft together as a single tied-together assembly.

In some implementations, each spacecraft may contribute substantially equally to the required propulsion and control forces. Command and control responsibility may be allocated primarily to one spacecraft, or shared and coordinated among the spacecraft. In some implementations, all or a majority of energy for orbit raising may be provided by only one spacecraft, and the other spacecraft can be considerably simplified. This arrangement is also applicable to more than two spacecraft, where some of the spacecraft can be simplified. The orbit raising maneuver may include firing a chemical propulsion thruster and/or an electric propulsion thruster.

Figure 3:
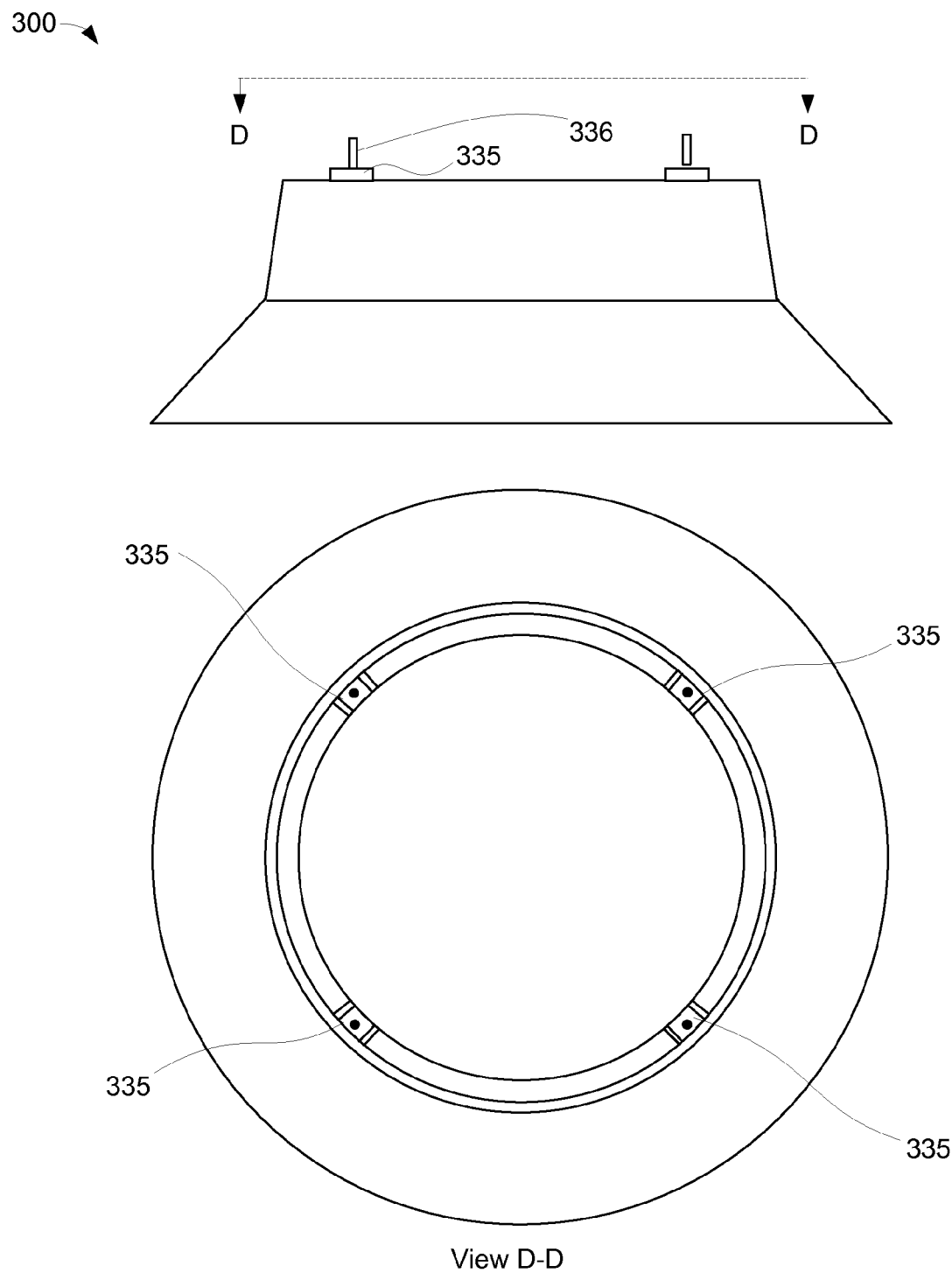
FIG. 3 illustrates an example implementation of a launch vehicle interface adapter structure.

In some implementations, the spacecraft adaptor structures 215(1) and 215(2) may include some reinforced points to correspond to reinforced points in the launch vehicle interface adapter structure to allow efficient load path to spacecraft internal structures. Referring now to FIG. 3, for example, a launch vehicle interface adapter structure 300 with four such points is illustrated. Each strong point 335 may be configured with a respective deployment mechanism 336 that may detachably secure the spacecraft to the launch vehicle interface adapter structure, in addition to or instead of the conventional or a reinforced band clamp. The strong points 335 and respective deployment mechanisms 336 may be used in addition to or instead of a conventional launch vehicle adapter ring. It will be appreciated that, although omitted for clarity in FIG. 3, launch vehicle interface adapter structure may ordinarily include electrical in-flight disconnects for each spacecraft.

Figure 4:
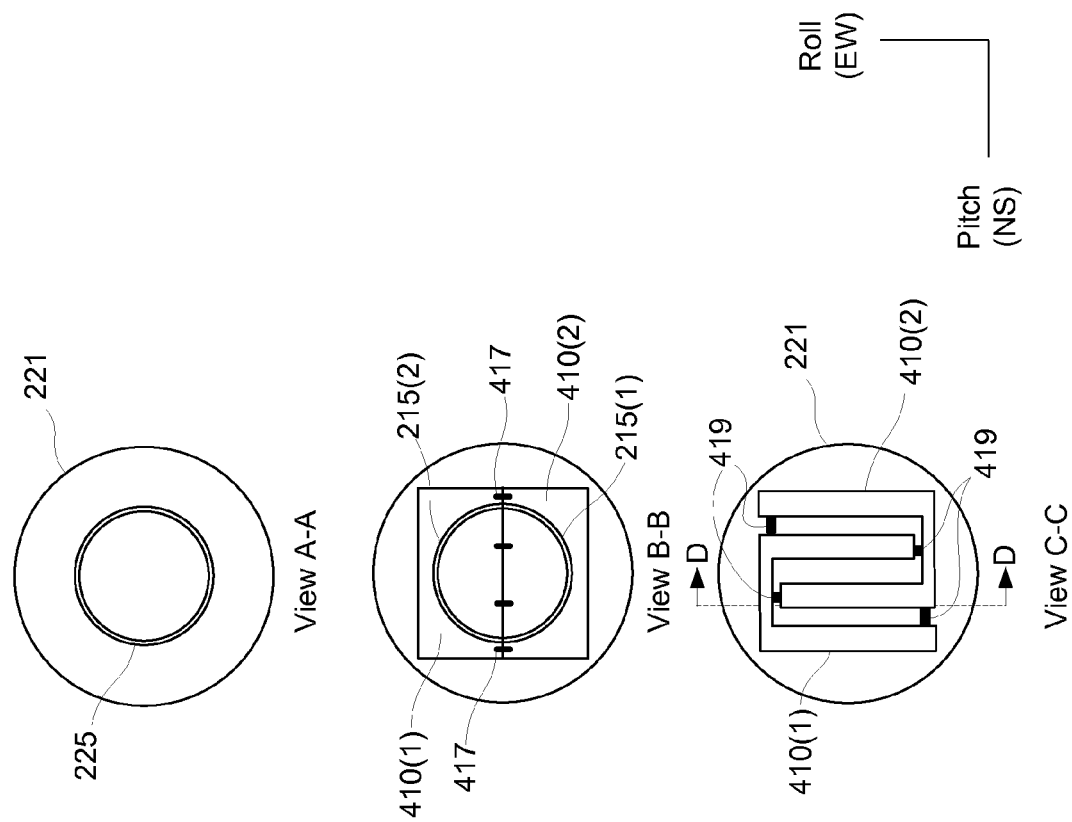
FIG. 4 illustrates techniques for interfacing a payload to a launch vehicle according to another implementation.

Referring now to FIG. 4, in some implementations two spacecraft 410(1) and 410(2) may each be configured in a substantially 'U' shaped configuration. As illustrated in View C-C, for example, at least a portion of spacecraft 410(1) may have a central recess within which an outboard segment of spacecraft 410(2) may be disposed in a launch configuration. Similarly, at least a portion of spacecraft 410(2) may have a central recess within which an outboard segment of spacecraft 410(1) may be disposed in the launch configuration. The space between the segments in View C-C may accommodate deployable appendages (not shown). Holddown devices 417 and 419 may detachably secure the two spacecraft before and during launch, and separate the two spacecraft after the tied-together spacecraft combination is released from the launch vehicle, or after some or a substantial part of orbit raising. Subsequent to deployment, the two spacecraft may be configured to drift away from each other in a direction generally parallel to the roll axis.

The implementation illustrated in FIG. 4 may provide the advantages of the configuration described above in connection with FIG. 2. Additionally, the configuration illustrated in FIG. 4 may facilitate spacecraft ground integration and test as a result of the central recesses permitting better access to the back side of the north and south panels during these operations.

In some implementations, one of spacecraft 410 may be a dummy structure for the purpose of simulating a second spacecraft and to support the first spacecraft during launch. Such implementations may be useful, for example, to mitigate schedule delays in the event that one spacecraft of a planned dual spacecraft launch is unavailable.

Figure 1E:
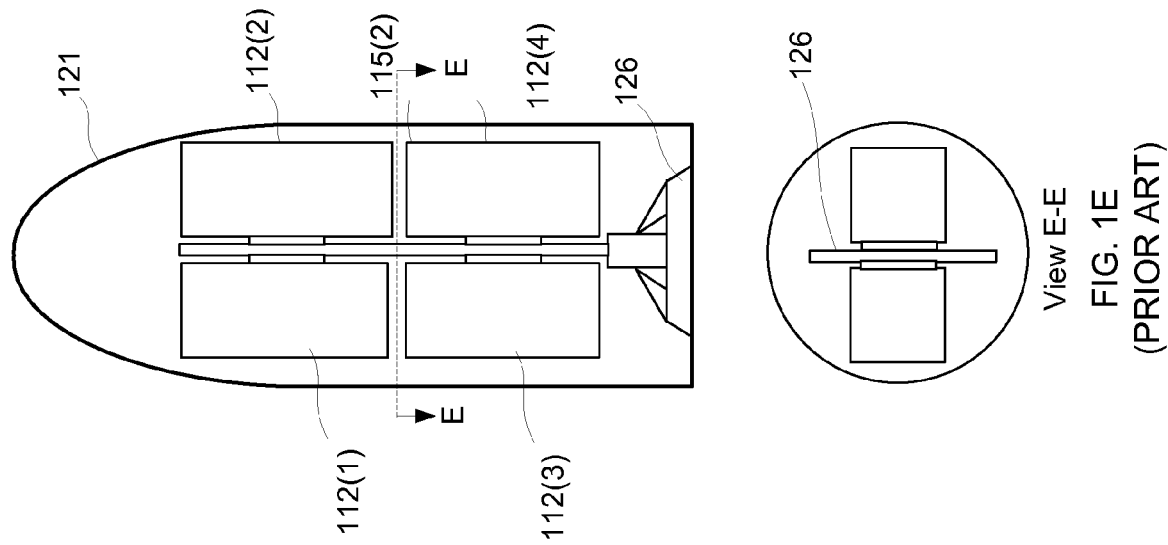
Figure 1D:
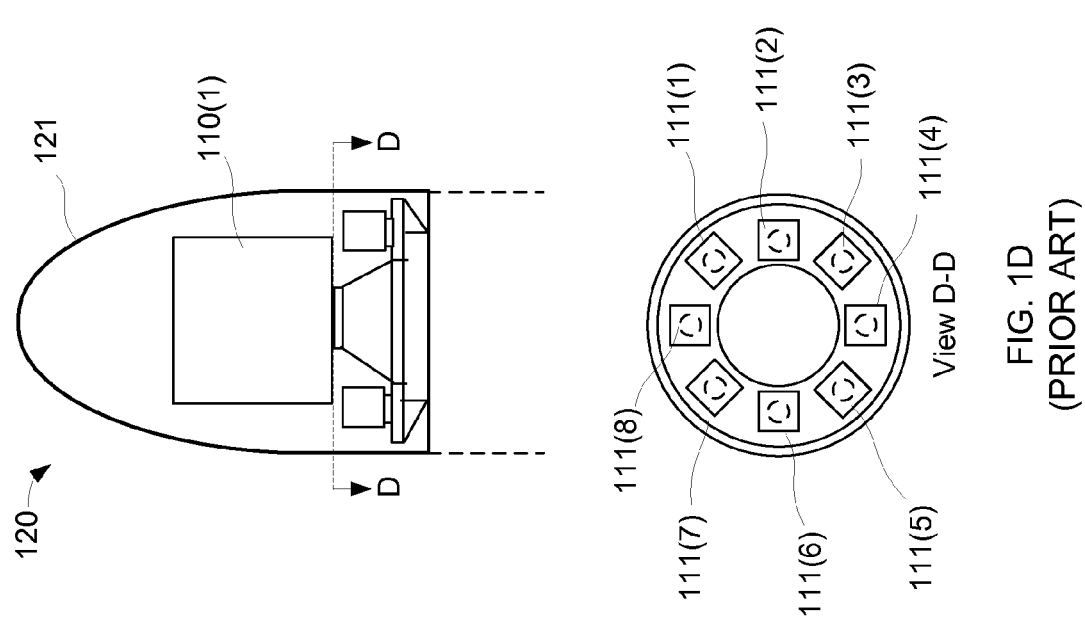

The foregoing merely illustrates principles of the invention. It will thus be appreciated that those skilled in the art will be able to devise numerous systems and methods which, although not explicitly shown or described herein, embody said principles of the invention and are thus within the spirit and scope of the invention as defined by the following claims. For example, the presently disclosed techniques may be combined with conventional dual launch configuration illustrated in FIG. 1B or 1C. One or both of the adaptors 115(1) and 115(2) can function as adaptor 225 such that the conventional stacked dual launch vehicle market can enjoy the benefits of the configuration disclosed in the present invention. Conventional multiple launch configurations exemplified in FIGS. 1D and 1E can likewise be adapted. Combinations of FIG. 1B/1C with rider spacecraft illustrated in FIG. 1D and the configuration disclosed in this invention is also possible.

What is claimed is:

1. A payload for a launch vehicle, the payload including at least two spacecraft, wherein:
    the launch vehicle includes a payload adapter;
    each spacecraft has a launch vehicle adapter structure providing a respectively coplanar structural interface directly with the payload adapter; and
    the spacecraft share a launch vehicle payload fairing volume substantially side-by-side and are detachably coupled together, in a launch configuration, by at least one holddown device extending from between facing non-abutting body surfaces of the at least two spacecraft such that a positive clearance is provided between facing non-abutting body surfaces of each spacecraft.

2. The payload of claim 1, wherein the coplanar structural interface is substantially orthogonal to a longitudinal axis of the launch vehicle.

3. The payload of claim 1, wherein at least one of the at least two spacecraft is a dummy structure that simulates a real spacecraft, structurally supports another of the at least two spacecraft, and completes an interface with the launch vehicle for launch.

4. The payload of claim 1, wherein the at least two spacecraft are detachably secured relative to each other by the at least one holddown device, the at least one holddown device being configured to be released after launch.

5. The payload of claim 4, wherein the at least one holddown device is detached only after performing at least one orbit raising maneuver with an onboard propulsion system of at least one of the at least two spacecraft.

6. The payload of claim 4, wherein the at least one holddown device is detached only after performing at least one orbit raising maneuver with an onboard propulsion system of only one of the at least two spacecraft.

7. The payload of claim 1, wherein:
    at least one of the two spacecraft is configured to be deployed in an on-orbit configuration having an orbital plane, the spacecraft having a yaw axis within the orbital plane and directed from a spacecraft coordinate system origin toward nadir, a pitch axis orthogonal to the orbit plane and passing through the spacecraft coordinate system origin, and a roll axis orthogonal to the pitch axis and the yaw axis and passing through the spacecraft coordinate system origin;
    the spacecraft includes a first panel and a third panel substantially disposed, in the on-orbit configuration, respectively, orthogonal to the pitch axis and facing toward opposite directions, each panel having a first width in a first direction parallel to the roll axis; and a second and a fourth panel substantially disposed, in the on-orbit configuration, respectively, orthogonal to the roll axis and having a second width in a second direction parallel to the pitch axis, wherein:
    an aspect ratio of the first width to the second width is substantially greater than one.

8. The payload of claim 7, wherein the aspect ratio is at least two.

9. The payload of claim 7, wherein the facing non-abutting body surfaces of each spacecraft are generally orthogonal to the pitch axis.

10. The payload of claim 1, wherein:
    at least a portion of each spacecraft has a substantially 'U' shaped configuration, including a central recess, and two outboard segments;
    at least one outboard segment of a first spacecraft is disposed, in the launch configuration, within the central recess of a second spacecraft.

11. An apparatus for launch by a launch vehicle, the apparatus comprising a first spacecraft and a second spacecraft, wherein:
    the launch vehicle includes a payload adapter;
    each of the first spacecraft and the second spacecraft has a launch vehicle adapter structure providing a respectively coplanar structural interface directly with the payload adapter; and
    the first spacecraft is configured to share, substantially side-by-side with the second spacecraft, a launch vehicle payload fairing volume, and is detachably coupled with the second spacecraft by at least one holddown device extending from between facing non-abutting body surfaces of the first spacecraft and the second spacecraft such that a positive clearance is provided between the facing non-abutting body surfaces.

12. The apparatus of claim 11, wherein the positive clearance defines a first volume within the launch vehicle payload fairing volume, and deployable appendages of one or both of the first spacecraft and the second spacecraft are disposed within the first volume during launch.

13. The apparatus of claim 11, wherein at least one spacecraft adaptor has a plurality of reinforced points that to correspond to reinforced points in the launch vehicle interface adapter structure.

14. The apparatus of claim 11, wherein:
    at least one spacecraft of the first spacecraft and the second spacecraft is deployed in an on-orbit configuration having an orbital plane, the at least one spacecraft having a yaw axis within the orbital plane and directed from a spacecraft coordinate system origin toward nadir, a pitch axis orthogonal to the orbit plane and passing through the spacecraft coordinate system origin, and a roll axis orthogonal to the pitch axis and the yaw axis and passing through the spacecraft coordinate system origin;
    the at least one spacecraft includes a first panel and a third panel substantially disposed, in the on-orbit configuration, respectively, orthogonal to the pitch axis and facing toward opposite directions, each panel having a first width in a first direction parallel to the roll axis; and a second and a fourth panel substantially disposed, in the on-orbit configuration, respectively, orthogonal to the roll axis and having a second width in a second direction parallel to the pitch axis, wherein:
    an aspect ratio of the first width to the second width is substantially greater than one.

15. The apparatus of claim 14, wherein the aspect ratio is at least two.

16. The apparatus of claim 14, wherein the facing non-abutting body surfaces of each of the first spacecraft and the second spacecraft are generally orthogonal to the pitch axis.

17. The apparatus of claim 11, wherein the at least one holddown device is configured to be released after launch.

18. The apparatus of claim 17, wherein the at least one holddown device is detached only after performing one or more orbit raising maneuver with an onboard propulsion system of at least one of the two spacecraft.

19. The apparatus of claim 17, wherein the at least one holddown device is detached only after performing an orbit raising maneuver with an onboard propulsion system of only one of the first spacecraft and the second spacecraft.

20. The apparatus of claim 11, wherein:
- at least a portion of each spacecraft has a substantially 'U' shaped configuration, including a central recess, and two outboard segments;
- at least one outboard segment of a first spacecraft is disposed within the central recess of a second spacecraft.

\* \* \* \* \*